United States Patent [19]
Adams et al.

[11] Patent Number: 6,078,477
[45] Date of Patent: Jun. 20, 2000

[54] HEAT TRANSFER PLATE FOR AN ACTUATOR ASSEMBLY

[75] Inventors: Carl F. Adams, Yukon; Curtis A. Trammell, Blanchard, both of Okla.

[73] Assignee: Seagate Technology, Inc., Scotts Valley, Calif.

[21] Appl. No.: 09/126,112

[22] Filed: Jul. 30, 1998

Related U.S. Application Data

[60] Provisional application No. 60/075,713, Feb. 24, 1998.

[51] Int. Cl.[7] .............................. G11B 5/55; G11B 33/14
[52] U.S. Cl. ........................................ 360/106; 360/97.02
[58] Field of Search ................................ 360/106, 97.02, 360/97.03

[56] References Cited

U.S. PATENT DOCUMENTS

| | | | |
|---|---|---|---|
| 4,544,973 | 10/1985 | Van De Bult | 360/106 |
| 4,780,776 | 10/1988 | Dushkes | 360/97.03 |
| 4,967,291 | 10/1990 | Touchton et al. | 360/78.04 |
| 4,988,903 | 1/1991 | Koriyama | 360/97.02 |
| 5,031,059 | 7/1991 | Yamaguchi et al. | 360/97.03 |
| 5,136,439 | 8/1992 | Weispfenning et al. | 360/77.08 |
| 5,262,907 | 11/1993 | Duffy et al. | 360/97.05 |
| 5,517,372 | 5/1996 | Shibuya et al. | 360/97.02 |
| 5,696,649 | 12/1997 | Boutaghou | 360/97.02 |

FOREIGN PATENT DOCUMENTS

| | | |
|---|---|---|
| 2-073574 | 3/1990 | Japan . |
| 2-168474 | 6/1990 | Japan . |
| 2-179974 | 7/1990 | Japan . |
| 2-227883 | 9/1990 | Japan . |

*Primary Examiner*—Craig A. Renner
*Attorney, Agent, or Firm*—Crowe & Dunlevy

[57] ABSTRACT

An improved actuator assembly for a disc drive, the actuator assembly having an E-block which at a proximal end supports an array of read/write heads in reading and writing data relationship to a plurality of spinning data discs which create air currents that convectively cool the E-block, the E-block supporting at a distal end an electrical coil which interacts with a magnet assembly of the disc drive to selectively position the actuator assembly in response to control voltages introduced to the electrical coil. A portion of the control voltage is dissipated as heat energy by the electrical coil, and a heat transfer plate is provided to thermally connect the electrical coil and the E-block to provide conductive heat transfer of the heat energy to the E-block which acts as a heat sink for the electrical coil.

10 Claims, 3 Drawing Sheets

HEAT TRANSFER PLATE FOR AN ACTUATOR ASSEMBLY

RELATED APPLICATIONS

This application claims priority to Provisional Application No. 60/075,713 entitled HARD DISC DRIVE ACTUATOR WITH A HEAT CONDUCTING PLATE, filed Feb. 24, 1998.

FIELD OF THE INVENTION

The present invention relates generally to the field of disc drive data storage devices, and more particularly but not by way of limitation, to an improved actuator for a disc drive.

BACKGROUND

Modern disc drives are commonly used in a multitude of computer environments, ranging from super computers to notebook computers, to store large amounts of data in a form that can be made readily available to a user. Typically, a disc drive has one or more magnetic discs that are rotated by a spindle motor at a constant high speed. Each disc has a data recording surface divided into a series of generally concentric data tracks radially spaced across a band having an inner diameter and an outer diameter.

The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer which senses the magnetic transitions on a selected data track to read the data stored on the track. Alternatively, the interactive element transmits an electrical signal that induces magnetic transitions on the selected data track to write data to the track.

As is known in the art, each read/write head is mounted to a load arm that is supported by an actuator arm and is selectively positionable by a rotary actuator assembly over a selected data track of the disc to either read data from or write data to the selected data track. The read/write head includes a slider assembly having an air bearing surface that, in response to air currents caused by rotation of the discs, causes the read/write head to fly adjacent the disc surface with a desired gap separating the read/write head and the corresponding disc.

Typically, a plurality of open-center discs and spacer rings are alternately stacked on a spindle motor hub. The hub, defining the core of the stack, serves to align the discs and spacer rings around a common axis. Collectively the discs, spacer rings, and spindle motor hub define a disc pack assembly. The surfaces of the stacked discs are accessed by the read/write heads which are mounted on a complementary stack of actuator arms which form part of an actuator assembly. The actuator assembly generally includes head wires which conduct electrical signals from the read/write heads to the flex circuit which, in turn, conducts the electrical signals to a flex circuit connector. The flex circuit connector is mounted to a flex circuit mounting bracket, and the mounting bracket is mounted to a disc drive basedeck. External to the basedeck, the flex circuit connector is secured to a printed circuit board assembly (PCB).

The actuator assembly interacts with a magnet assembly of the disc drive to selectively move the actuator arms so as to selectively position the read/write heads. This interaction generally involves the relative movement of an electrical coil and a magnetic circuit created by a pair of opposing magnets. In one embodiment the coil is attached to the actuator assembly and rotates therewith within the magnetic field of stationary magnets. In an alternative embodiment it is known to attach the magnets to the actuator assembly and rotate them adjacent an electric coil.

In either case, the electric coil is energized with a control current to create an electromagnetic field which interacts with the magnetic circuit to move and position the actuator assembly. The recent trend in the industry is to reduce drive seek time, the time required to move the read/write head from a current data track to a target data track. One way of reducing seek time is to increase the relative amount of current to the electric coil. As the current is increased the operating temperature of the coil likewise increases, as a proportionate amount of the electrical energy is dissipated as heat energy. One skilled in the art will understand that the amount of current that can be passed through a coil is generally a function of its electrical resistance, which is directly proportional to the temperature of the coil. As the temperature of the coil increases, the magnitude of the control current is limited, adversely affecting the drive seek time. Moreover, elevated coil temperatures can also adversely affect the seek time performance by generally weakening the strength of the magnetic circuit of the magnet assembly.

There is a long-felt need in the industry for an improved actuator assembly that provides thermal heat transfer from the electric coil of the voice coil motor, so as to reduce the accumulation of heat energy in the coil to reduce the coil operating temperature.

SUMMARY OF THE INVENTION

The present invention is directed to a disc drive assembly having an actuator assembly that conductively transfers heat energy from a voice coil motor and convectively dissipates the heat energy to cool the voice coil motor. In a preferred embodiment the actuator assembly has an E-block that is pivotally supported by the disc drive, the E-block supporting an array of read/write heads in data reading and writing relationship to a plurality of spinning data discs. The spinning discs create air currents which convectively cool the E-block.

Opposite the read/write heads the E-block supports an electrical coil as part of a voice coil motor, which selectively positions the actuator assembly by the introduction of a control current to the electrical coil. A portion of the control current is dissipated as heat energy which tends to increase the operating temperature of the electrical coil.

A heat transfer plate thermally connects the electrical coil to the E-block so that the heat energy can be conductively transferred from the electrical coil to the E-block. The cooling of the E-block by the spinning discs results in a thermal gradient such that the E-block functions as a heat sink to cool the electrical coil.

The electrical coil is formed from the combination of an outer coil portion and an inner coil portion. The heat transfer plate has projecting legs interposed between the coil portions to increase the contact surface area between the heat transfer plate and the electrical coil.

The heat transfer plate of the present invention cools the electrical coil reducing the electrical resistance and allowing the use of a larger control current to reduce seek time. Reducing the operating temperature of the voice coil motor also lessens the temperature degradation of the magnetic circuit strength. Other advantages and features of the present invention will be apparent from the following description when read in conjunction with the drawings and appended claims.

DETAILED DESCRIPTION

Figure 1:
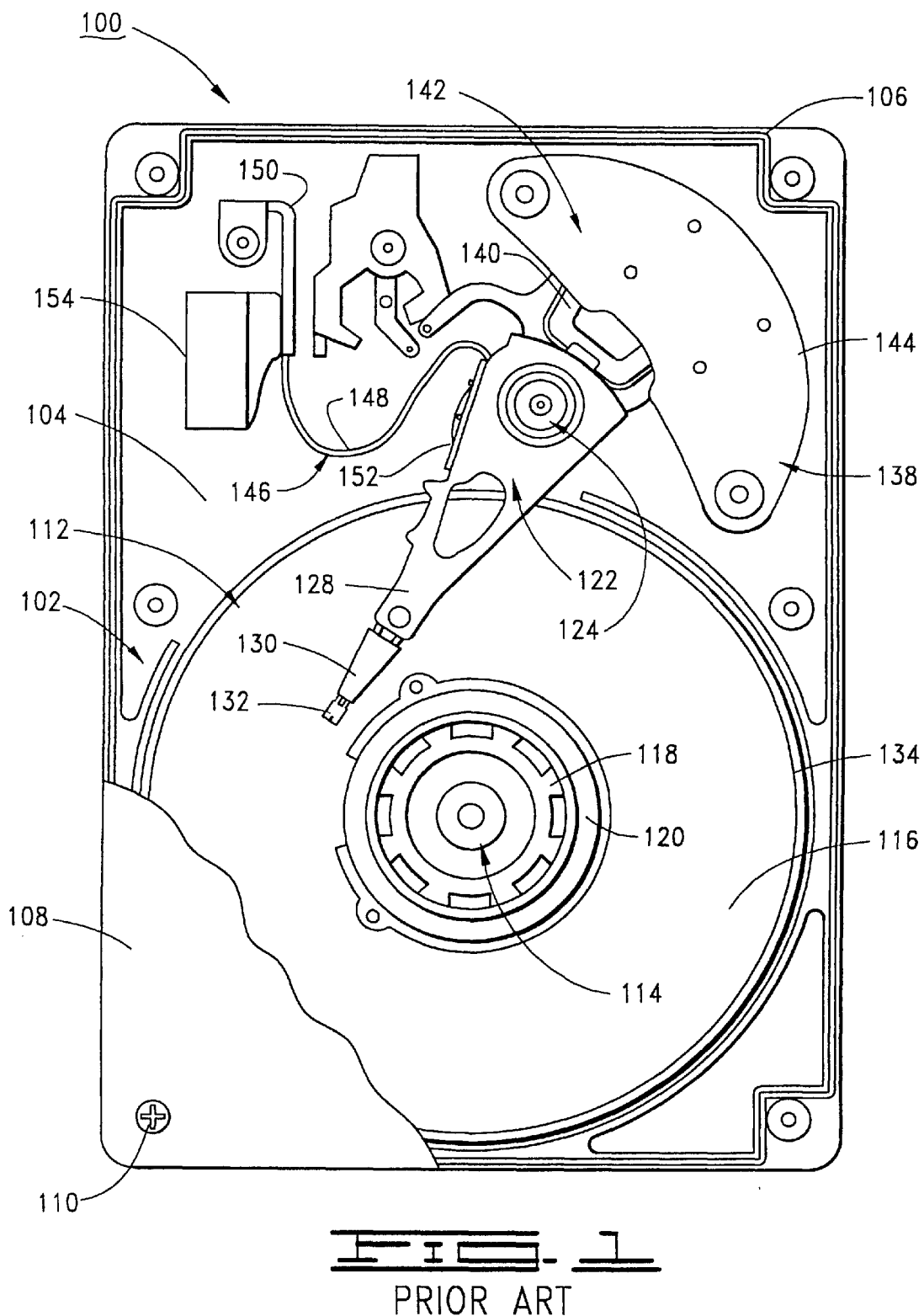
FIG. 1 is a plan view of a disc drive constructed in accordance with the prior art.

Referring to the drawings in general, and more particularly to FIG. 1, shown therein is a plan view of a typical prior art disc drive 100 in which the present invention is especially useful. The disc drive 100 includes a head disc assembly (HDA) 102, which includes a basedeck 104 to which various disc drive components are mounted, a gasket 106, a top cover 108 (partially cutaway), and fasteners 110, which together provide a sealed internal environment for the HDA 102. It will be understood that numerous details of construction of the disc drive 100 are not included in the following description as such are well known to one skilled in the art and are unnecessary for the purpose of describing the present invention.

Mounted to the basedeck 104 is a disc pack assembly 112 having a spindle motor 114 with a plurality of alternately stacked discs 116 and spaces (not shown) disposed about a spindle motor hub 118 and secured thereto by a clamp ring 120. Adjacent the discs 116 is an actuator assembly 122 which pivots about a cartridge bearing 124. The actuator assembly 122 has a centrally disposed E-block 126 (FIG. 2) which forms a plurality of actuator arms 128 (only one shown) that support load arm assemblies 130. Each of the load arm assemblies 130 supports a read/write head 132, with each of the read/write heads 132 corresponding to a surface of one of the discs 116. Each of the discs 116 has a data recording surface divided into concentric circular data tracks (not shown), and the read/write heads 132 are positioned adjacent the data tracks to read data from or write data to the tracks. An outer extremity of the data recording surface is circumscribed by a guard band 134, and the inner extremity by a landing zone (not shown).

The actuator assembly 122 of the prior art disc drive 100 is pivotally positioned by way of a voice coil motor assembly (VCM) 138, having an actuator coil 140 immersed in the magnetic field generated by a magnet assembly 142. The magnet assembly 142 is mounted to the basedeck 104 and to the top cover 108, and consists of a pair of opposing magnets (not shown) each supported by a magnetically permeable flux path (such as a steel plate 144) to complete the magnetic circuit of the VCM 138. When a control current is passed through the actuator coil 140, an electromagnetic field is set up which interacts with the magnetic circuit of the magnet assembly 142 to cause the actuator coil 140 to move relative to the magnet assembly 142 in accordance with the well-known Lorentz relationship.

To provide the requisite electrical conduction paths between the read/write heads 132 and the disc drive read/write circuitry (not shown), read/write head wires (not separately shown) are routed on the actuator assembly 122 from the read/write heads 132, along the load arm assemblies 130 and the actuator arms 128, to a flex circuit assembly 146. The flex circuit assembly 146 has a flex circuit 148, a flex circuit mounting bracket 150, a printed circuit board (PCB) 152 and a disc drive PCB connector 154. The read/write head wires are secured by way of a suitable soldering process to corresponding pads of the PCB 152. The flex circuit 148 is connected to the flex circuit mounting bracket 150 in a conventional manner which in turn is connected by the disc drive PCB connector 154 through the basedeck 104 to a disc drive PCB (not shown) mounted to the underside of the basedeck 104. The disc drive PCB provides the disc drive read/write circuitry to control the operation of the read/write heads 132, as well as other interface and control circuitry for the disc drive 100.

Figure 2:
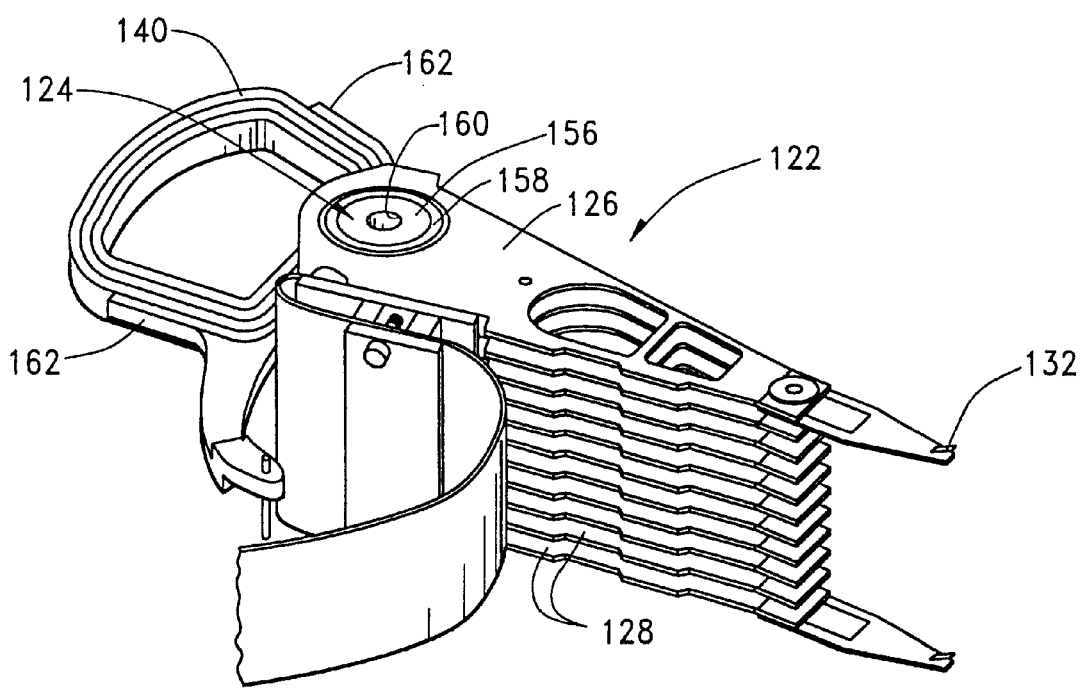
FIG. 2 is a perspective view of an actuator assembly utilized by the prior art disc drive of FIG. 1.

FIG. 2 is a perspective view of a portion of the prior art actuator assembly 122 which is pivotally supported by the cartridge bearing 124. The cartridge bearing 124 is of a conventional design known in the art, having a stationary shaft 156 and a rotatable sleeve 158 supported by a number of ball bearings (not shown) therebetween. The E-block 126 is attached to the sleeve 158 for pivotal movement about the stationary shaft 156. A fastener (not shown) engages an aperture 160 at an upper end of the stationary shaft 156 to secure the cartridge bearing 124 to the top cover 108. Likewise, a fastener engages another aperture (not shown) at a lower end of the stationary shaft 156 to secure the cartridge bearing 124 to the basedeck 104.

The E-block 126 forms the actuator arms 128 at a proximal end as well as a pair of coil support arms 162 at a distal end. The coil 140 is formed by winding an epoxy coated wire about a forming mandrel in a conventional manner to achieve the desired number of windings. After winding the wire the formed coil 140 is heated to meld the epoxy. In this manner the epoxy joins and supports the wire in the final coil 140 shape, and insulates the wire to prevent short circuiting of the coil 140. The formed coil 140 is disposed within and supported by the coil support arms 162 by an epoxy material injected therebetween.

Figure 3:
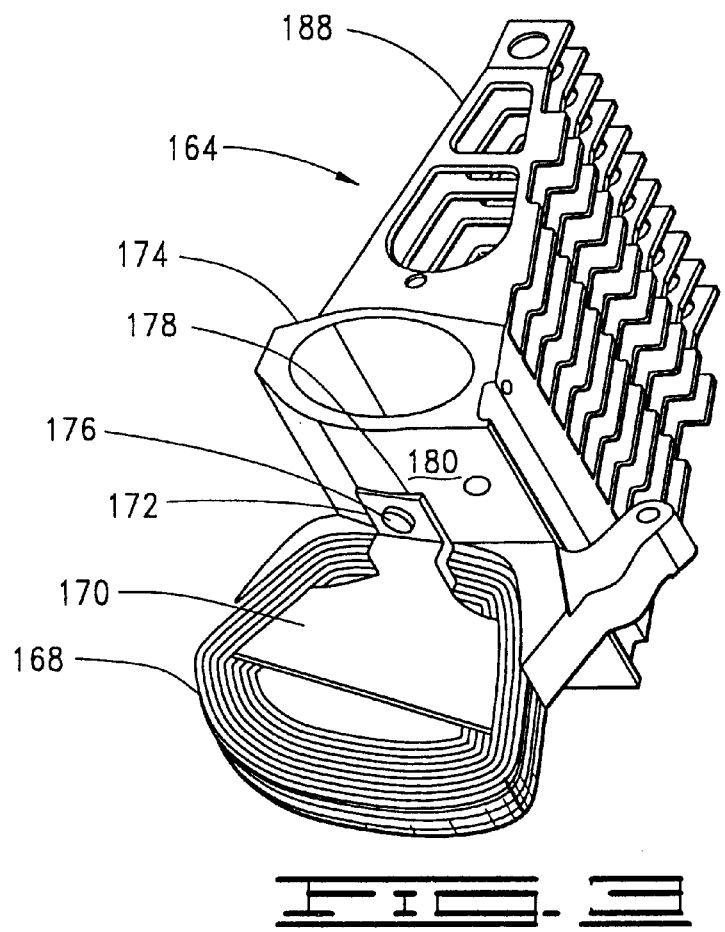
FIG. 3 is a perspective view of a portion of an actuator assembly of the present invention.

FIG. 3 is a perspective view of a portion of an actuator assembly 164 constructed in accordance with a preferred embodiment of the present invention. It will be noted that the actuator assembly 164 of the present invention, modified as described below, is well suited for use in the prior art disc drive of FIG. 1.

It will be noted that an actuator coil 168 supports a heat transfer plate 170 that has an upstanding portion 172 pressingly engaging an E-block 174 by an attaching fastener 176 cooperating with a receiving aperture (not shown) in the E-block 174. In this manner the heat transfer plate 170 is mechanically connected to both the coil 168 and the E-block 174 to permit conductive heat transfer therebetween. In a preferred embodiment the upstanding portion 172 has an abutting surface 178 that is formed to accommodate the shape of an abutting surface 180 of the E-block 174, so as to maximize the surface-to-surface contact area between the upstanding portion 172 and the E-block 174 for maximum heat transfer therebetween. In the preferred embodiment shown in FIG. 3, for example, the abutting surface 180 forms a generally convex surface and the abutting surface 178 accommodatingly forms a generally concave surface. In an alternative preferred embodiment these face-to-face surfaces may both be flat formed portions, as represented by the upstanding portion 172 shown in FIG. 4.

Figure 4:
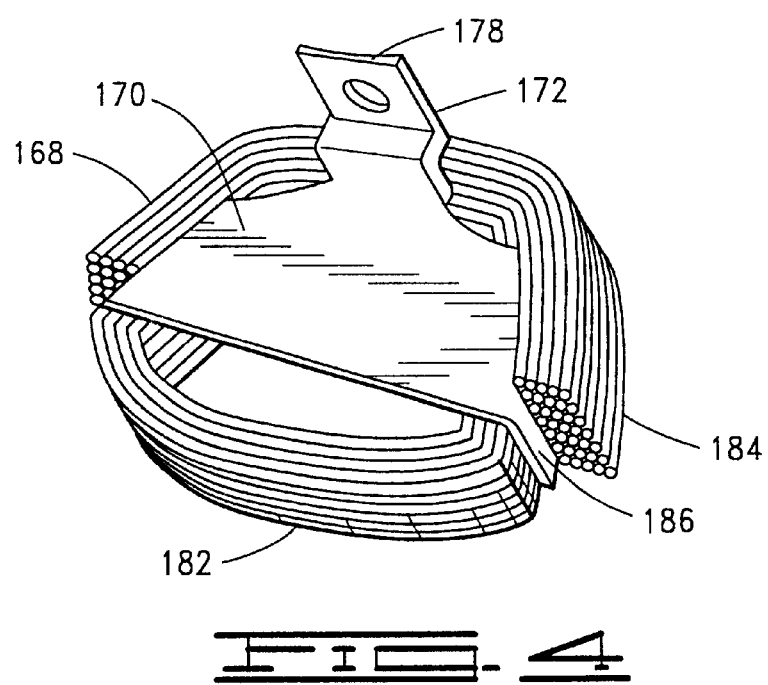
FIG. 4 is a partially broken view of a portion of the actuator assembly of FIG. 3.

FIG. 4 is a partially cutaway perspective view of the coil 168 showing an inner coil 182 and an outer coil 184 and the heat transfer plate 170 having leg members 186 (only one shown) sandwiched between the inner coil 182 and the outer coil 184.

In a preferred embodiment of the present invention the inner coil 182 and the outer coil 184 are individually formed. The heat transfer plate 170 is placed over the inner coil 182 and the outer coil 184 is then placed around both the inner coil 182 and the heat transfer plate 170. After all three components are thus combined, the assembled components can be heated to meld the epoxy coating on the coil wire. Where the heat transfer plate 170 and the wire abuttingly contact, the epoxy on the wire melds to join the wire to the heat transfer plate 170.

Where the inner coil 182 and outer coil 184 are formed independently and married together as previously described, each of the coils 182, 184 will have a pair of terminal leads. These leads are preferably joined so as to electrically connect the coils 182, 184 in series to effectuate a single coil made up of the two individually formed coils 182, 184. For example, the output lead of the outer coil 184 can be connected to the input lead of the inner coil 182 to electrically bridge the coils 182, 184 in series. In this manner the input lead of the outer coil 184 and the output lead of the inner coil 182 are connected to a disc drive power circuit providing the control current to position the actuator assembly 164.

In an alternative preferred embodiment the coil 168 is formed as a single coil with the heat transfer plate 170 inserted into the coil winding process. In this embodiment the coil 168 is partially wound to form the inner coil 182 and then the winding process is paused. The heat transfer plate 170 is then placed over the inner coil 182 and the winding process is resumed to form the outer coil 184. An advantage of a single wound coil is that the intermediate electrical connection between individual coils 182, 184 is eliminated.

The heat transfer plate 170 is thus interposed between the inner coil 182 and the outer coil 184 in order to provide a thermal link between the coil 168 and the E-block 174. Actuator arms 188 (FIG. 3) are positioned adjacent the spinning discs 116 which produce air currents that convectively cools the proximal end of the E-block 174. The coil 168 produces a localized hot spot as heat energy is generated by the control voltage used to position the actuator assembly 164. The heat transfer plate 170 provides a thermal link between the coil 168 and the E-block 174, establishing a heat transfer path for the thermal gradient established between the relatively hot coil 168 and the relatively cool actuator arms 188.

To provide the thermal link, the heat transfer plate 170 made of a thermally conductive material. In a preferred embodiment the heat transfer plate 170 is made of a metal material. It is advantageous to form the heat transfer plate 170 from the same metal as the E-block 174, typically aluminum or magnesium, so that the heat transfer plate 170 and the E-block 174 have a common heat transfer coefficient to expand and contract in unison. This eliminates potential induced strain on the heat transfer plate 170 and the electrical coil 168 from relative movement between the heat transfer plate 170 and E-block 174. Such relative movement could damage the melded connection of the wire to the heat transfer plate 170.

To minimize cost, the heat transfer plate 170 is preferably stamped and formed to the described configuration including the upstanding portion 172 and the oppositely projecting legs 186. Edges of the heat transfer plate 170 which contact the coil 168 must be smooth to prevent scarring or chaffing of the epoxy insulation on the wire of the coil 168. Otherwise the insulation can be penetrated resulting in a short circuit between wire loops of the coil 168 or between the coil 168 and the heat transfer plate 170. Because stamping inherently produces sharp sheared edges, a secondary operation such as deburring or etching is desirable to provide non-damaging smooth edges on the heat transfer plate 170.

The present invention provides an improved actuator assembly (such as 164) for use in a hard disc drive (such as 100). The actuator assembly has an E-block (such as 174) which is pivotally supported by attachment to a sleeve (such as 158) of a cartridge bearing (such as 124). The E-block forms a plurality of actuator arms (such as 188) which are disposed adjacent a plurality of spinning discs (such as 116) that produce air currents to convectively cool the E-block. Opposite the actuator arms the E-block supports an electrical coil (such as 168) which receives a control current to produce an electromagnetic field which interacts with a magnetic circuit of a magnet assembly (such as 142) to pivotally position the actuator assembly.

The coil supports a heat transfer plate (such as 170) which is also connected to the E-block to provide a thermal link between the electrical coil and the E-block for conductive heat transfer. The electrical coil is cooled as heat is conductively transferred to the E-block, which by being cooled by the air currents thus acts as a heat sink for the electrical coil.

Although the preferred embodiment described hereinabove describes the use of the pivoting actuator assembly, it will be recognized that alternative embodiments are likewise within the scope of the present invention, such as a linear positionable actuator assembly.

It is clear that the present invention is well adapted to attain the ends and advantages mentioned as well as those inherent therein. While a presently preferred embodiment of the invention has been described for purposes of the disclosure, it will be understood that numerous changes may be made which will readily suggest themselves to those skilled in the art and which are encompassed within the spirit of the invention disclosed and as defined in the appended claims.

What is claimed is:

1. An actuator for a disc drive, the actuator supporting a read/write head in a data reading and writing relationship to a rotatable disc, the read/write head positioned to selected positions of the disc by a magnet assembly that interacts with the actuator, the actuator comprising:

an E-block pivotally supported by the disc drive;

an electrical coil supported by the E-block and disposed adjacent the magnet assembly, the electrical coil comprising an outer coil portion comprising an outer plurality of windings and an inner coil portion comprising an inner plurality of windings; and a heat transfer plate thermally connecting the electrical coil and the E-block for conductive heat transfer from the coil to the E-block, wherein the heat transfer plate comprises a leg portion interposed between the outer coil portion and the inner coil portion.

2. The actuator of claim 1 wherein the heat transfer plate is made from a thermally conductive material.

3. The actuator of claim 2 wherein the thermally conductive material is metal.

4. The actuator of claim 1 wherein the heat transfer plate has an upstanding portion and wherein the actuator further comprises a fastening member attaching the upstanding portion to the E-block.

5. The actuator of claim 4 wherein the E-block has an abutting portion with a radius of curvature, and the upstanding portion of the heat transfer plate has a radius of curvature determined so that the upstanding portion is contiguous with the abutting portion of the E-block.

6. In a disc drive assembly having a base deck, a spindle motor supported by the base deck, a disc connected to the spindle motor for rotation and having a data surface, a cover which cooperates with the base deck to provide a sealed enclosure, and a cartridge bearing supported by the basedeck and the cover, an actuator assembly comprising:

an E-block pivotally supported by the cartridge bearing;

an electrical coil supported by the E-block and comprising an outer coil portion having a plurality of windings and an inner coil portion having a plurality of windings; and a heat transfer plate thermally connecting the electrical coil and the E-block for conductive heat transfer between the electrical coil and the E-block, wherein the head transfer plate comprises a leg portion interposed between the outer coil portion and the inner coil portion.

7. The disc drive of claim 2 wherein the heat transfer plate is made of a thermally conductive material.

8. The disc drive of claim 7 wherein the thermally conductive material is metal.

9. The disc drive of claim 6 wherein the heat transfer plate further comprises an upstanding portion, and wherein the actuator assembly further comprises:

fastening means for fastening the upstanding portion of the heat transfer plate to the E-block.

10. The disc drive of claim 9 wherein the E-block has an abutting portion with a radius of curvature, and wherein the upstanding portion of the heat transfer plate has a radius of curvature determined such that the upstanding portion is contiguous with the abutting portion of the E-block.

\* \* \* \* \*